Aug. 15, 1961  E. S. RUSSEY  2,995,909

TRANSMISSION COUPLING

Filed Dec. 6, 1957

Inventor:
Edward S. Russey
By: Ray E. Snyder
Atty

United States Patent Office 2,995,909
Patented Aug. 15, 1961

2,995,909
TRANSMISSION COUPLING
Edward S. Russey, Muncie, Ind., assignor to Borg-Warner Corporation, a corporation of Illinois
Filed Dec. 6, 1957, Ser. No. 701,011
2 Claims. (Cl. 64—27)

This invention relates to coupling means, particularly for interconnecting the crankshaft of an internal combustion engine with the input shaft of a transmission.

It is an object of the present invention to provide improved coupling means including a vibration damper for interconnecting an engine crankshaft with a transmission input shaft.

It is another object to provide improved coupling means, in accordance with the preceding object, particularly adapted to be utilized in applications where a minimum of axial space is available between the crankshaft of the engine and the input shaft of a transmission.

It is still another object to provide an improved coupling member in accordance with the preceding objects which is of a generally saucer-shaped configuration and adapted to be attached to the engine crankshaft and to the outer periphery of a vibration damper for interconnecting said crankshaft with the input shaft of the transmission through said vibration damper.

It is an additional object to provide an improved coupling member of a generally saucer-shaped configuration having an access opening for facilitating the mounting of the coupling member on the engine crankshaft.

Figure 1:
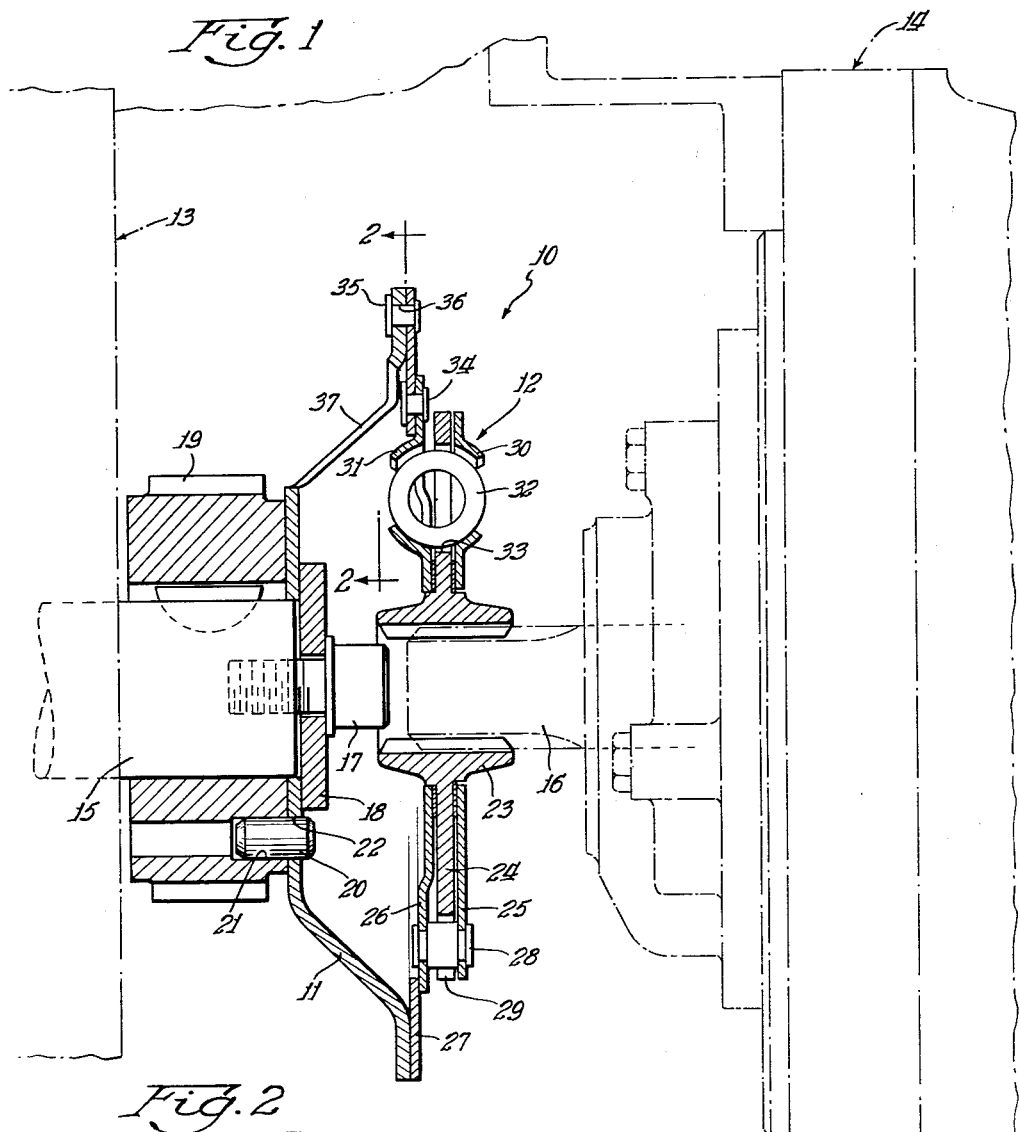
Figure 2:
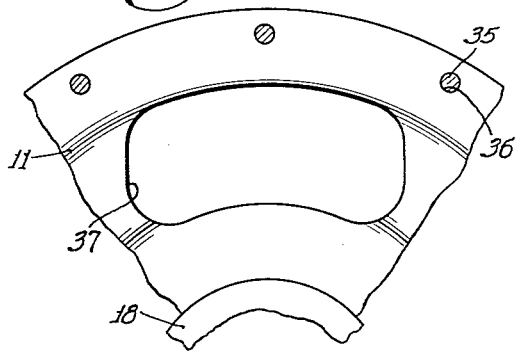

The invention consists of the novel constructions, arrangements and devices to be hereinafter described and claimed for carrying out the above stated objects and such other objects as will appear from the following description of a preferred form of the invention, illustrated with reference to the accompanying drawings, wherein:

FIG. 1 is a sectional view of the improved coupling means of the present invention as utilized to interconnect an engine crankshaft with an input shaft of a transmission; and FIG. 2 is a view taken on line 2—2 of FIG. 1.

Like characters of reference designate like parts in the several views.

Referring now to FIG. 1, there is illustrated the improved coupling means of the present invention designated generally by the numeral 10. The coupling means 10 comprises a saucer-shaped drive plate 11 and a vibration damper 12 disposed between an internal combustion engine 13 and a transmission 14. The drive plate 11 is connected to a crankshaft 15 of the engine 13 and the vibration damper 12 is splined on an input shaft 16 of the transmission 14.

The drive plate 11 is attached to the crankshaft 15 by means of a machine screw 17 and a washer 18, with the machine screw 17 threaded into an end of the crankshaft 15. A timing gear 19 is keyed on the crankshaft 15, and a driving connection between the timing gear 19 and the drive plate 11 is provided by means of a plurality of dowel pins 20. The dowel pins 20 fit into cylindrical recesses 21 formed in the timing gear 19 and extend through holes 22 formed in the drive plate 11 near the inner periphery thereof.

The vibration damper 12 in general comprises a hub 23 splined on the input shaft 16, a radially extending flange 24 formed integrally with the hub 23, spring housing plates 25 and 26 disposed on opposite sides of the flange 24, and an annular plate 27 attached to the housing plate 26. The housing plates 25 and 26 are secured together by a plurality of rivets 28 which extend through notches 29 in the outer periphery of the flange 24. The housing plates 25 and 26 are formed with a plurality of spring retaining shrouds 30 and 31 which enclose springs 32 disposed within registering spring openings 33 formed in the flange 24. The annular plate 27 is attached to the housing plate 26 by a plurality of rivets 34 and is also attached to the drive shaft 11 by a plurality of rivets 35.

A rigid driving connection is established from the crankshaft 15 through the timing gear 19, the dowel pins 20, the drive plate 11, the annular plate 27, and the housing plates 25 and 26. The springs 32 disposed within the retaining shrouds 30 and 31 and the openings 33 in the flange 24 function to cushion any torsional variations in driving torque from the crankshaft 15.

Referring now to FIG. 2, there is shown a side view of the drive plate 11 illustrated in FIG. 1. The drive plate 11 is formed with a plurality of holes 36 for accommodating the rivets 35, and an access window 37. The window 37 is of an elongated configuration and is of sufficient width to accommodate the washer 18 when the drive plate 11 is assembled on the crankshaft 15. The annular plate 27 is riveted to the vibration damper 12 and the drive plate 11 is riveted to the plate 27 prior to assembly on the crankshaft 15. The drive plate 11 is attached to the crankshaft 15 by placing the inner periphery of the drive plate 11 adjacent to the timing gear 19 on the end of the crankshaft 15, inserting the washer 18 through the access window 37, and inserting the machine screw 17 through the hub 23 of the vibration damper 12 and threading the machine screw 17 into the end of crankshaft 15. The washer 18 is of a greater diameter than the inner diameter of the drive plate 11, and holds the plate 11 in contact with the timing gear 19.

In assembling the damper 12 to the end of the crankshaft, it is assumed that the transmission 14 is out of its illustrated position, remote from the shaft 15 and the engine 13. The coupling 10 may be held in a horizontal position with the inside surface of the saucer-shaped stamping drive plate 11 being horizontal and facing upwardly. The washer 18 is then slipped through the opening 37 and is centered approximately under the splined opening in the hub 23. Thereafter the screw 17, which may be of the Allen type with a hexagonal recess in the head, is picked up on the end of the Allen wrench and is inserted through the splined opening in the hub 23 and through the hole in the washer 18. The hexagonal wrench is then held in position in the recess in the head of the screw 17 and the entire group of loose parts is turned 90° so that the axis of the screw 17 occupies a horizontal position. Thereafter, the entire group of parts can be easily mounted on the end of the crankshaft 15 holding the assembly 10 generally in the proper position with one hand and turning the Allen wrench for screw 17 with the other.

Thereafter the transmission 14 is assembled into its illustrated position, moving the transmission input shaft 16 into the splined portion of the hub 23.

In many applications, as for example in marine engines, the transmission 14 is driven from the anti-flywheel end of the engine crankshaft 15, which requires the inclusion of the vibration damper 12 between the crankshaft 15 and the input shaft 16. It is contemplated that vibration dampers of different diameter may be utilized with a drive plate 11 of a given size. To accommodate vibration dampers of different diameter, it is necessary to vary only the size of the annular plate 27.

The coupling means 10 provided by the present invention occupies a minimum of axial space between the crankshaft 15 and the input shaft 16 of the transmission 14, as is apparent from the figures. There has been provided by this invention improved coupling means for interconnecting the crankshaft of an internal combustion engine with the input shaft of a transmission, said means including a vibration damper and a generally saucer-shaped drive plate having an access opening formed therein for facilitating the assembly of the improved coupling means on the crankshaft of the engine.

I wish it to be understood that my invention is not to be limited to the specific construction and arrangement shown and described except only insofar as the appended claims may be so limited, as it will be apparent to those skilled in the art that changes may be made without departing from the principles of the invention.

I claim:

1. Coupling means for interconnecting a relatively large diameter shaft with a relatively small diameter shaft comprising a vibration damper having a hub with an opening therethrough receiving the small diameter shaft and having a driving connection therewith, a driving plate of a generally saucer-shaped configuration permanently attached to said vibration damper and positioned on said large diameter shaft, said driving plate being formed with an access opening therethrough, a washer fitting on the end of said large diameter shaft fixed over said drive plate for holding the drive plate fixed on the large diameter shaft, said washer being larger in diameter than said hub opening and smaller in diameter than said access opening so that it may be moved into and positioned within said drive plate through said access opening, and a screw passing through said washer and into said large diameter shaft for fixing said washer and drive plate with respect to the large diameter shaft, said screw being smaller in diameter than said hub opening so that it can be moved through the hub opening into position.

2. Coupling means for interconnecting a relatively large diameter crankshaft of an internal combustion engine with a relatively small diameter transmission input shaft comprising a vibration damper having a hub splined onto the small diameter shaft so as to have a driving connection therewith, a drive plate of a generally saucer-shaped configuration permanently attached to said vibration damper at the outer peripheries of the drive plate and damper and positioned on said large diameter crankshaft, said drive plate being formed with an access opening therethrough, a washer fitting on the end of said large diameter shaft over said drive plate for hodling the drive plate fixed on the end of the large diameter crankshaft, said washer being larger in diameter than the opening in said hub and smaller in diameter than said access opening so that it may be moved into and positioned within said drive plate through said access opening, and a screw passing through said washer and into said large diameter shaft for fixing said washer and drive plate with respect to the large diameter shaft, said screw being smaller in diameter than said hub opening so that it can be moved through the hub opening into position.

References Cited in the file of this patent

UNITED STATES PATENTS

| | | |
|---|---|---|
| 1,525,793 | Benzon | Feb. 10, 1925 |
| 1,825,402 | Judson | Sept. 29, 1931 |
| 2,622,215 | Piekarski et al. | Dec. 16, 1952 |

FOREIGN PATENTS

| | | |
|---|---|---|
| 645,800 | Germany | June 3, 1937 |
| 1,152,807 | France | Sept. 9, 1957 |